United States Patent [19]

Schindler et al.

[11] Patent Number: 5,767,947
[45] Date of Patent: Jun. 16, 1998

US005767947A

[54] PROCESS AND DEVICE FOR THE PRODUCTION OF SO- CALLED INDEX CARDS

[75] Inventors: Hans-Georg Schindler, Holzkirchen; Hans-Juergen Rauh, Strasslach-Hailafing; Lothar Prause, Munich, all of Germany

[73] Assignee: Agfa Gevaert Aktiengesellschaft, Leverkusen, Germany

[21] Appl. No.: 738,677

[22] Filed: Oct. 25, 1996

[30] Foreign Application Priority Data

Oct. 25, 1995 [DE] Germany ............... 195 39 677.4

[51] Int. Cl.[6] ........................................... G03B 27/52
[52] U.S. Cl. .............................. 355/40; 355/39; 355/77
[58] Field of Search ........................... 355/39, 40, 41–43, 355/77

[56] References Cited

U.S. PATENT DOCUMENTS 4,896,186  1/1990  Tokuda ........................... 355/40
5,337,119  8/1994  Tanibata ......................... 355/40

*Primary Examiner*—Arthur T. Grimley
*Assistant Examiner*—Herbert V. Kerner
*Attorney, Agent, or Firm*—Furgang & Milde, LLP

[57] ABSTRACT

A method and apparatus for the production of individual prints and index prints from films which contain recorded data regarding the circumstances surrounding the exposure of the individual pictures stored on the film. Recorded data on the film is read, the data being associated with an individual picture and concerning a desired print format for the individual picture. The recorded data is preferably stored magnetically, but may also be stored optically. The system produces an individual print of the individual picture having a format based on the read data. The system also identifies, by modification of an image of the individual picture formed on the index print, the region of the film printed on the individual print and of the regions not printed, based on the read data.

14 Claims, 3 Drawing Sheets

5,767,947

PROCESS AND DEVICE FOR THE PRODUCTION OF SO- CALLED INDEX CARDS

FIELD OF THE INVENTION

The invention relates to the field of methods and apparatus for the production of individual prints and index prints from photographic films, and more particularly to the production of prints and index prints of films which contain, in particular, magnetically recorded data regarding the surrounding circumstances of the exposure of the individual pictures stored on the film.

BACKGROUND OF THE INVENTION

In comparison with individual prints of the original pictures that are stored on photographic film, index prints are markedly smaller images, with multiple reduced-size images printed together on a single sheet, along with the picture numbers, in order to give the photography enthusiast an overview of the content of his developed and completely processed film. Index prints of this type are especially advantageous when used with a new photographic system which, in order to protect his originals, prevents the photography enthusiast from taking the developed film out of the cartridge. Such a system is disclosed in U.S. Pat. No. 5,093,686, for example.

In the case of a photographic system in accordance with EP 0 674 213 A1, pictures may be exposed on a specially prepared film surface while information may be simultaneously stored in a magnetic layer on the film, for example indicating the picture format to be used during printing. As an alternative, this format information can also be optically encoded during the taking of the picture, exposed on the film in such manner as to be associated with that picture. The photographic print device, by means of which the individual prints of the pictures are later created, then uses magnetic or optical means to read the print format that has been provided, and adjusts the enlarging device and/or format masking accordingly during printing. However, since with this system the picture stored on the film always occupies the same area independently of the chosen print format, it is not possible to detect from a complete reproduction of the picture on the index print the print format which the operator of the camera had preselected.

In EP 0 674 213 A1, code letters are provided which are associated with each picture, designating the printing format of the individual print to be exposed on the index print, for example, "PAN" for an individual panorama print. The problem that exists with this system, however, is that the inexperienced photography enthusiast in particular knows little or nothing about such codes.

JP 05-27406 (A) describes an index print in which different picture formats are represented by graphical dividing lines on the pictures. This type of representation, however, makes it difficult for an inexperienced photography enthusiast to understand which print format is indicated on the index print, or used to produce the individual print.

In addition, depending on the camera's features and equipment, the calendar date of the taking of the photograph can be stored on the magnetic layer of a photographic film. From EP 615 154 A1, for example, a form of index print has been disclosed in which the calendar date of the photograph is exposed below each individual picture. However, this severely limits the space available for the photograph if the date is intended to be easily read. Thus, this type of added exposure is at the expense of the size of the index-print pictures, which then makes it difficult or impossible to see the differences, especially if there are slight differences, e.g., in a series of portrait pictures.

SUMMARY OF THE INVENTION

The present invention therefore provides an index print system which represents the data which is stored on the photographic film regarding the print format of the pictures in such a way that, to the greatest possible extent, the total area of the index print is available for the pictures, and the print format is as easy as possible to identify.

In order to represent the data on the index print while making the total index print area available for pictures, the format information on the index print is converted into a simple, visually identifiable form. Further, on each picture of the index print an identification is made of those parts of the picture which were not reproduced in the individual print. The picture format which was stored when the picture was taken and reproduced in the individual print can be seen by the person looking at the index print at first glance, so to speak.

In accordance with the invention, the magnetic or optical data recorded on the film with regard to the chosen photo format are converted into a region-by-region identification of the corresponding pictures on the index print. Preferably, this identification extends over the entire region of the index-print picture which was not reproduced in the individual print. When this is done, the picture contents which are located in the identified regions remain largely identifiable.

In a preferred embodiment of the invention, those regions of the index-print pictures which were not reproduced in the corresponding individual print are identified by means of, or have superimposed on them, markings in the form of increases or decreases of density, discoloration or decoloration, or by means of dot patterns or line patterns. Since the contents of the index print picture are recorded point by point as pixels corresponding to image signals from an electronic imaging device reading information from the film, superimpositions or changes of the picture contents of the index prints can be carried out by means of electronic image processing with little additional expense. Since the regions of the original picture which were not reproduced in the prints are made distinguishable on the index prints, the difference between the picture in the index print and the picture in the individual print are immediately apparent.

In a further embodiment of the invention, calendar data which are assigned to the individual pictures are converted into the start and end dates of the series of photographs on the film. As a rule, this represents adequate information for the photo enthusiast regarding the index print. The start and end dates can be shown in a relatively large size in a prominent position on the index print without it being necessary to find space at the expense of the reproduction of the individual pictures.

It is noted that the index print may include images corresponding to an entire film cartridge, or a portion of the images on the film. Thus, the relevant dates or date ranges may be for the entire film cartridge, regardless of the images present on the index print, or of the particular images on the index print. The present invention may accommodate either scheme, or another scheme. Thus, since the index print image is defined in a digital composer, one or more programs may be stored and appropriately executed under the various circumstances either automatically, or as defined by an operator or photography enthusiast.

The present invention can be used to particular advantage for films whose data regarding the circumstances surrounding the taking of the pictures are stored magnetically, and/or for films which are rewound in a sealed cartridge after the finishing process, since these data cannot be found on the film or prints by the photography enthusiast visually.

It is also noted that the index print format may also be employed in digital photography environments, wherein the images are electronically or magnetically stored and reproduced using a digital printing process.

It is therefore an object of the invention to provide a method and apparatus for the production of individual prints and index prints from films which contain, magnetically or optically recorded data regarding the surrounding circumstances of the exposure of the individual pictures stored on the film, wherein the data recorded on the film, allocated to a picture and concerning a desired print format for the picture, are on the one hand used for creating the individual print of the picture, and on the other, are converted into an identification, on the individual print of the corresponding picture on the index print, of the regions not reproduced.

It is also an object of the invention to provide an index print system wherein an identification is made, superimposed on the picture content of the regions not reproduced on the individual print, in the form of markings including increases or decreases of density, discoloration or decoloration, line patterns or demarcation lines.

It is a further object of the invention to provide an index print system wherein calendar dates which represent the earliest and latest dates of the taking of the pictures are stored magnetically on the film, and are reproduced in a prominent position on the index print. The position of the dates may be fixed on the index print, regardless of which picture was taken on which date, e.g., the image frames need not be exposed in chronological order.

It is a still further object of the invention to provide an index print system wherein the calendar dates of the first and last images are used as points of demarcation of the time span.

It is another object of the invention to provide an index print system wherein programs for the modification of the image signals for regions outside of the printed region are stored in a composer, and can be activated by means of a signal, read by a magnetic read device, regarding the picture format set during the taking of the photo.

It is a still further object of the invention to provide an index print system wherein a comparison device for the picture data information is provided, which determines the earliest and latest dates and stores the corresponding data in the composer for insertion as the time span of the photographs at a predetermined position on the index print.

These and other objects and features of the present invention will become more fully apparent from the following description and appended claims taken in conjunction with the accompanying drawings, in which like numerals refer to like parts.

DESCRIPTION OF THE PREFERRED EMBODIMENTS

Figure 1:
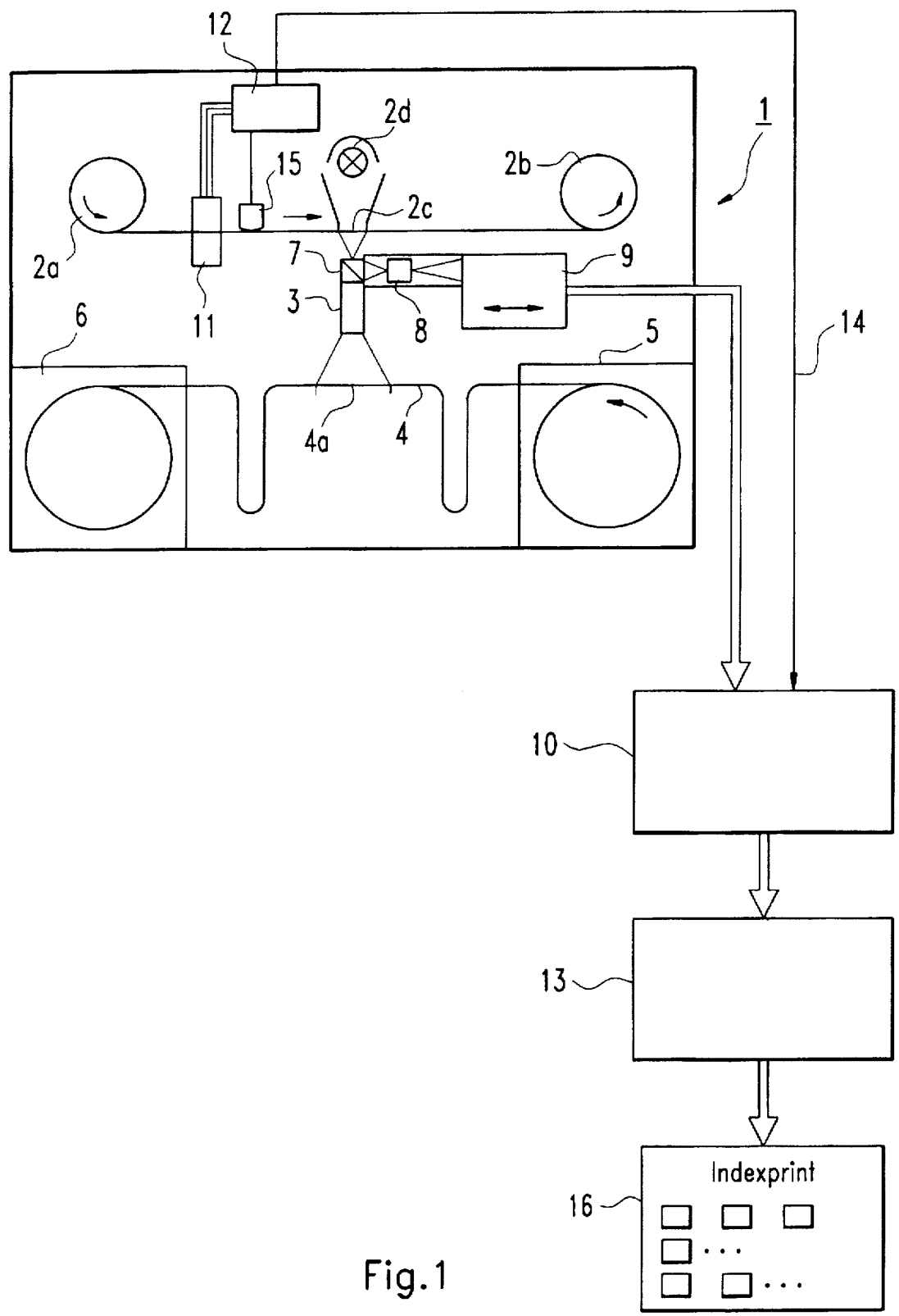
FIG. 1 shows a schematic view of a facility for the production of individual prints and index prints of photographic films according to the present invention.

The invention will now be described by way of the drawings, in which corresponding reference numerals indicate corresponding structures in the figures.

In FIG. 1, a photographic printer or a roll copier designated by a 1 is shown, in which a film strip 2 is directed from a take-off roll 2a over a negative window 2c to a take-up roll 2b. In the present embodiment, the film 2 is a color negative photographic film, but it could just as well be a positive film.

In the window 2c, one picture of the film 2 at a time, in particular, a negative, is projected via an objective lens 3 onto a window 4a of a strip 4 of photographic printing material, which is conveyed with two buffer loops from a cassette 5 by means of appropriate transport devices, not shown, to a take-up cassette 6. Between the negative to be illuminated by a light source 2d and to be printed in the window 2c and the objective lens 3, a beam splitter 7 is provided which copies the negative image in the window 2c into a video camera 9. The image signals supplied by the video camera 9 are directed in a known manner to an index-print composer 10, which stores the image signals, compares them to one another in terms of their intensity, and assembles a plurality of such images in reduced form onto one sheet for reproduction by an output device such as a CRT printer 13. This sheet is the index print 16. The composer 10 also contains the image processing device for the image signals.

In the path of the film 2 ahead of the copy window 2c, a measuring device 11 is placed, which, in a known way, measures the original pictures region by region in the three primary colors. From that, by means of the evaluation of logarithms, density values are determined which are sent to an image computer 12. The image computer 12 calculates, e.g., in accordance with the principles described in U.S. Pat. No. 4,279,502, the proper exposure compensation for the three colors which should be used for the printing of this original picture. A print that is created in this way is balanced with respect to its colors, which means that it may be made to very accurately match the subject originally photographed.

Behind the measuring device 11 in the direction of travel of the film 2, a magnetic read head 15 lies against the film strip to read data which have been applied to the back side of the film. The signals picked up in this way are passed along to the image computer 12 which controls the printing operation. Taken from this information are the format and image scale with which the original picture is to be printed, after it has reached the copy window 2c. The objective lens 3 is adjusted accordingly, and the masking of the strip of paper in the window 4a is modified. As a result, the individual print is processed according to the desired format, corresponding to the data stored on the film. Generally, this format information will exactly determine the format of the print. The information regarding the print format is also transmitted via the line 14 to the composer 10, which stores this information, along with the image signals of this original picture from the camera 9, in the image memory of the composer 10, in order to specially identify the areas 16a of the original picture 15 which are not included in the prints. As an alternative to or in addition to the magnetic read head 15, an optical read device may also be provided, by means of which the optical data stored as images on the film 2 are read.

Figure 2:
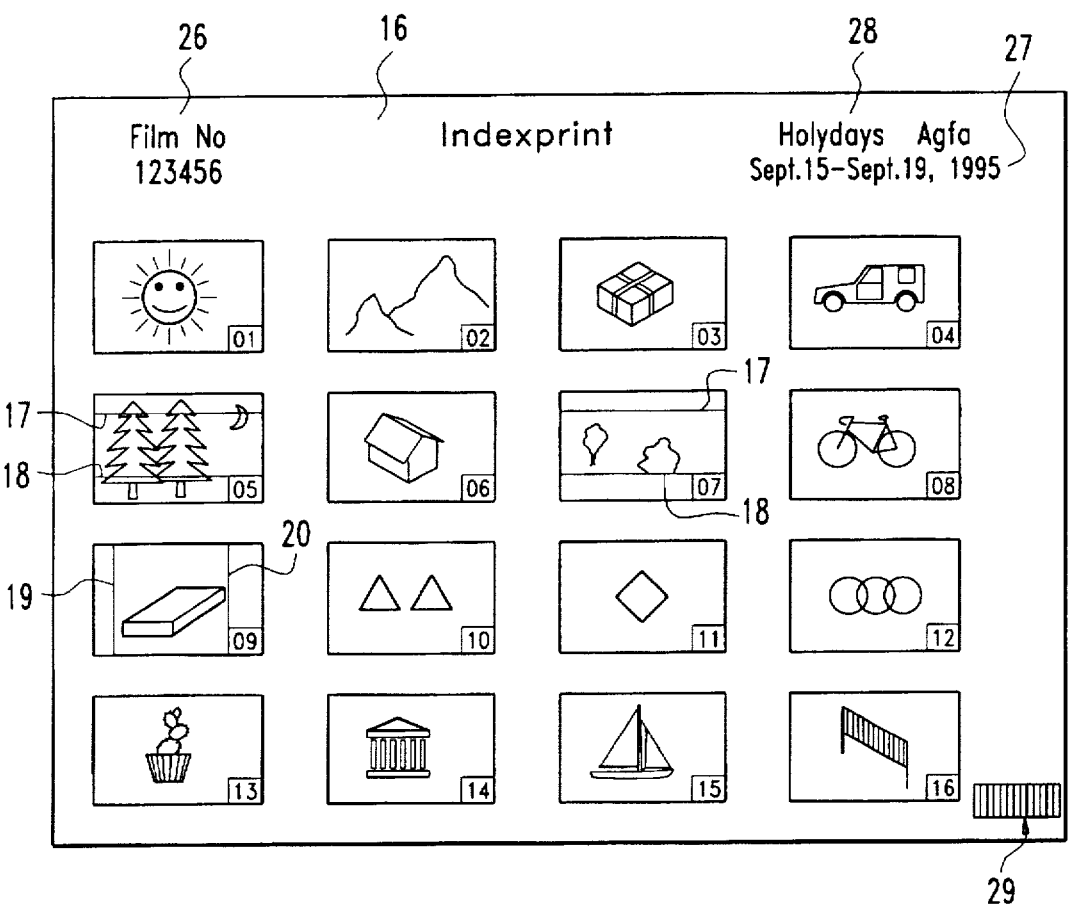
FIG. 2 shows an index print showing recorded information in accordance with various aspects and features in accordance with the invention.
Figure 3:
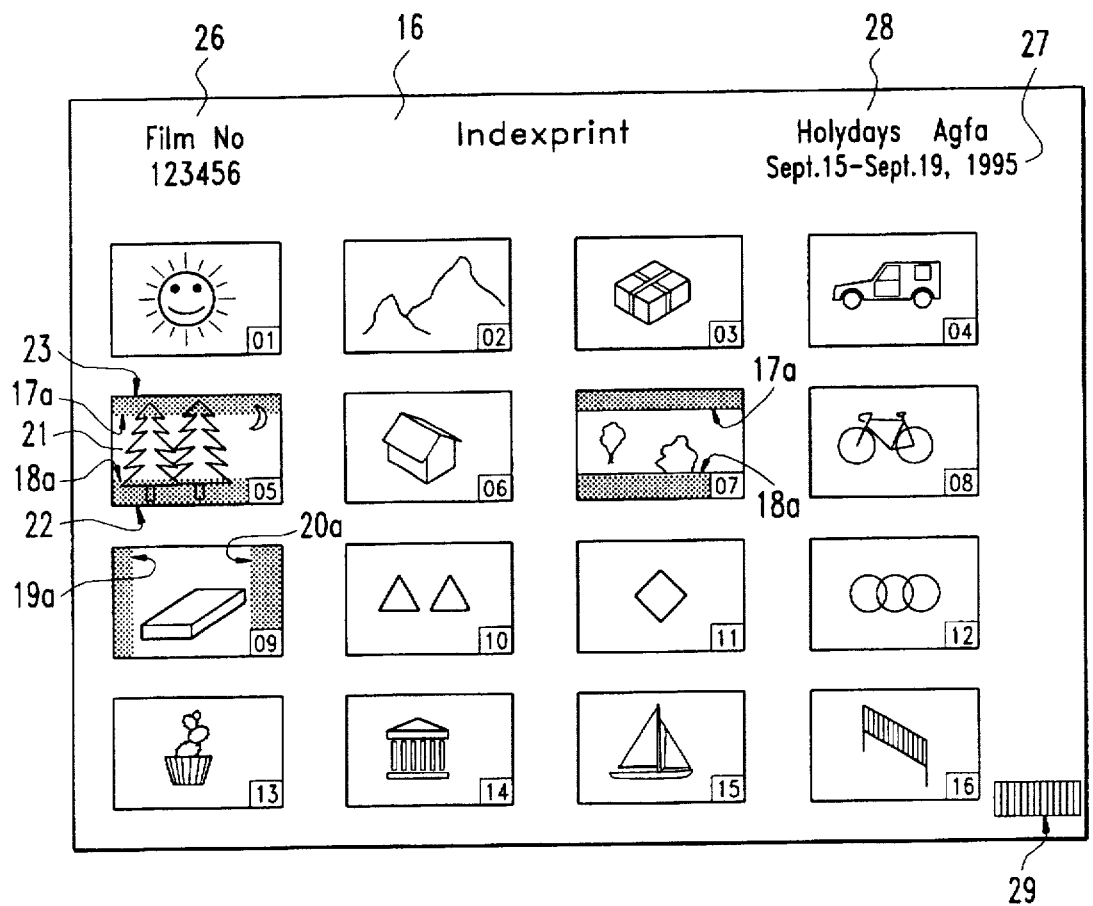
FIG. 3 shows a further index print according to the present invention.
Figure 4:
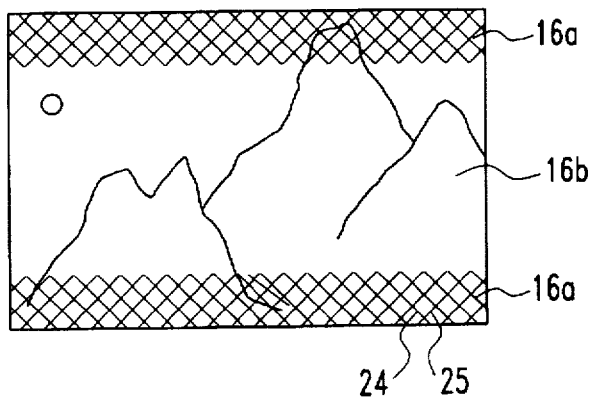
FIG. 4 shows an enlarged view of an index print, with superimposed lines on the regions of the original picture which were not printed.

In the FIGS. 2, 3 and 4, possibilities for the identification of the originally selected photograph format are shown. In FIG. 2, in the pictures with the numbers 05 and 07 on the index print 16, the non-printed portions of the original picture are separated from the middle region reproduced in the individual print by two lines 17, 18. The format of the respective individual prints correspond to the panorama format. In the picture with the number 09, for a format with less width relative to the height (classic format), the regions of the individual print at the two side edges which are not being reproduced in the print window 4a are also identified by two dividing lines 19, 20.

In FIG. 3, in the picture with the number 05, three areas 21, 22 and 23 are identified. They are separated from one another by means of the lines 17a, 18a, which are shown schematically. These schematic lines 17a, 18a correspond to the lines 17a, 18a of the picture with the number 07; however they are not visible in the picture with the number 05. In this picture, the picture contents of the regions 22, 23 are reproduced severely distorted in comparison with the contents of the region 21. This takes place as a result of the fact that these picture contents have been strongly darkened, that is, their density has been increased. As a result, the assigned format of the print corresponding to the printed region 21 and the regions 22, 23 not being reproduced in the individual print are immediately apparent to the observer. In the case of color pictures, in place of the brightness, the color saturation of the picture contents can be shown distorted as well.

In addition to the pictures 01 through 16 and data relative to them, there are also reproduced on the index print film-related data which were read from the film. In region 26, for example, a film number is provided. An additional example of the visual representation of magnetically or optically stored, film-related information is the period of time within which the photographs on this film and/or index print were exposed. In region 27, the calendar dates allocated to the taking of the first and last pictures are reproduced. By doing this, the period of time during which the photos on the film were taken becomes immediately apparent to the observer. The data, supplied by the read device 15, regarding the calendar dates of the photos, in particular, that of the first and last photos, are reproduced in a selected form, in a very legible size at the upper edge in accordance with FIG. 2. The photography enthusiast thus has, in nearly all cases, information regarding the period of time which is sufficient for classifying a film chronologically. A title which has been assigned to the film is provided in region 28. Finally, in region 29 a bar code has been applied to the index print, which provides processing-specific information, such as the film number, in a machine-readable, optically-encoded format.

In FIG. 4, for the identification of the regions 16a, which were not reproduced in the individual print, a pattern of crossed lines 24, 25 is superimposed on the picture content in those regions. The picture content of these regions remains visible, however. The superimposed patterns are stored in the composer 10 as a computing rule for the image-signal processing, and are activated by the appropriate format signals from the magnetic read head 15 during the preparation of the index print. Other computing rules can also be provided for superimposing by means of the image signals, for example, dot patterns or an increase or decrease in the density, modified coloration, including, for example, reproduction of that portion of the image in black-and-white, or the recording by optical exposure of text.

The format marking on the index print indicates to the observer of the index print the format in which prints of this original picture are normally to be made. If the photography enthusiast so desires, a full-format individual print of each original picture on the film can also be produced by bypassing the evaluation of the magnetic code.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention. Consequently, the full scope of the invention should be ascertained by the appended claims.

What is claimed is:

1. A method for the production of individual prints and index prints from films which contain recorded data regarding the circumstances surrounding the exposure of the individual pictures stored on the film, comprising the steps of:

reading data recorded on the film, said data being associated with an individual picture and concerning a desired print format for the individual picture;

producing an individual print of the individual picture having a format based on the read data; and identifying, by modification of an image of the individual picture formed on an index print, of the region of the film printed on the individual print and of the regions not printed, based on the read data.

2. The method in accordance with claim 1, wherein said modification of the reduced image comprises superimposing on an image content of the individual picture in the regions not reproduced on the individual print markings selected from the group consisting of increases or decreases of density, discoloration or decoloration, line or dot patterns and demarcation lines.

3. The method in accordance with claim 1, further comprising the steps of reading date information associated with individual pictures stored on the film, determining an earliest and latest date, and reproducing the earliest and latest date in a prominent position on the index print.

4. The method in accordance with claim 1, wherein the calendar dates of the first and last negatives are used as points of demarcation of a time span of the film.

5. The method in accordance with claim 4, wherein the index print is defined by a composer, further comprising the steps of comparing recorded data to determine an earliest and a latest date; and storing the earliest and latest date in the composer, the earliest and latest date being printed at a predetermined position on the index print.

6. The method in accordance with claim 1, comprising the steps of storing a plurality of programs for the modification of a non-printed regions of the individual picture formed on the index print, in a composer, and activating a selected program based on the recorded data representing the desired print format.

7. The method in accordance with claim 1, wherein the recorded data is read magnetically.

8. An apparatus for the production of individual prints and index prints from films which contain recorded data regarding the circumstances surrounding the exposure of the individual pictures stored on the film, comprising:

means for reading data recorded on the film, said data being associated with an individual picture and concerning a desired print format for the individual picture; and means for identifying, by modification of an image of the individual picture formed on the index print, of the region of the film printed on the individual print and of the regions not printed, based on the read data.

9. The apparatus in accordance with claim 8, wherein said identifying means superimposes on an image content of the individual picture in the regions not reproduced on the individual print, markings selected from the group consisting of increases or decreases of density, discoloration or decoloration, line patterns and demarcation lines.

10. The apparatus in accordance with claim 8, further comprising a memory for storing date information associated with individual pictures stored on the film, and means determining an earliest and latest date, and means for reproducing the earliest and latest date in a prominent position on the index print.

11. The apparatus in accordance with claim 8, wherein the calendar dates of the first and last negatives are used as points of demarcation of a time span of the film.

12. The apparatus in accordance with claim 11, further comprising a composer, for defining an index print content, means for comparing recorded data to determine an earliest and a latest date; the earliest and latest date being stored in the composer, and printed at a predetermined position on the index print.

13. The apparatus in accordance with claim 8, comprising a memory for storing a plurality of programs for the modification of a non-printed regions of the individual picture formed on the index print, in a composer, and a program execution device for activating a selected program based on the recorded data representing the desired print format.

14. The apparatus in accordance with claim 8, further comprising a magnetic reading device for reading the recorded data.

* * * * *